(12) United States Patent
Izumi

(10) Patent No.: US 9,136,723 B2
(45) Date of Patent: Sep. 15, 2015

(54) DISCHARGE CONTROL DEVICE FOR SECONDARY BATTERY

(75) Inventor: Junta Izumi, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 398 days.

(21) Appl. No.: 12/991,341

(22) PCT Filed: Apr. 14, 2009

(86) PCT No.: PCT/JP2009/057483
§ 371 (c)(1),
(2), (4) Date: Nov. 5, 2010

(87) PCT Pub. No.: WO2009/139252
PCT Pub. Date: Nov. 19, 2009

(65) Prior Publication Data
US 2011/0057618 A1  Mar. 10, 2011

(30) Foreign Application Priority Data

May 13, 2008 (JP) ................. 2008-126442

(51) Int. Cl.
| | |
|---|---|
| *H02J 7/00* | (2006.01) |
| *B60K 6/365* | (2007.10) |
| *B60K 6/445* | (2007.10) |
| *B60K 6/547* | (2007.10) |
| *B60W 10/26* | (2006.01) |
| *H01M 10/44* | (2006.01) |
| *B60K 6/28* | (2007.10) |
| *B60W 20/00* | (2006.01) |
| *H01M 10/0525* | (2010.01) |

(52) U.S. Cl.
CPC .............. *H02J 7/0063* (2013.01); *B60K 6/28* (2013.01); *B60K 6/365* (2013.01); *B60K 6/445* (2013.01); *B60K 6/547* (2013.01); *B60W 10/26* (2013.01); *H01M 10/44* (2013.01); *H02J 7/0075* (2013.01); *B60L 2240/486* (2013.01); *B60W 20/00* (2013.01); *B60W 2510/244* (2013.01); *B60W 2520/10* (2013.01); *B60W 2540/10* (2013.01); *B60W 2540/12* (2013.01); *B60W 2540/16* (2013.01); *H01M 10/0525* (2013.01); *H02J 2007/0067* (2013.01); *Y02T 10/6239* (2013.01); *Y02T 10/6278* (2013.01); *Y02T 10/7011* (2013.01)

(58) Field of Classification Search
USPC ....................................................... 320/129
See application file for complete search history.

(56) References Cited

U.S. PATENT DOCUMENTS

| | | | | |
|---|---|---|---|---|
| 5,307,000 | A | * | 4/1994 | Podrazhansky et al. ....... 320/129 |
| 5,998,968 | A | * | 12/1999 | Pittman et al. ................ 320/130 |

(Continued)

FOREIGN PATENT DOCUMENTS

| | | |
|---|---|---|
| JP | 4-363679 A | 12/1992 |
| JP | 5-64378 A | 3/1993 |
| JP | 9-107604 A | 4/1997 |
| JP | 11-26020 A | 1/1999 |

(Continued)

*Primary Examiner* — Edward Tso
*Assistant Examiner* — Robert Grant
(74) *Attorney, Agent, or Firm* — Sughrue Mion, PLLC

(57) ABSTRACT

The object aims to prevent or reduce the deterioration of a secondary battery by charge with an undue pulse. Disclosed is a discharge control device (100) for a secondary battery, which comprises: a detection unit (110) for detecting the charge of the secondary battery with a pulse having a level equal to or higher than a predetermined level; and a discharge control unit (130) for so controlling that at least one pulse having almost the same level as that of the above-mentioned pulse is discharged from the secondary battery when the charge of the secondary battery with the above-mentioned pulse is detected.

6 Claims, 5 Drawing Sheets

(56) References Cited

U.S. PATENT DOCUMENTS

| | | |
|---|---|---|
| 6,791,299 B2 | 9/2004 | Murakami et al. |
| 7,041,203 B2 * | 5/2006 | Sullivan ........................ 320/127 |
| 2009/0167253 A1 * | 7/2009 | Muraoka et al. .............. 320/152 |

FOREIGN PATENT DOCUMENTS

| | | |
|---|---|---|
| JP | 2002-313412 A | 10/2002 |
| JP | 2004-236381 A | 8/2004 |
| JP | 2005-51887 A | 2/2005 |

* cited by examiner

|  | CURRENT AMOUNT [A] | PERIOD OF TIME [sec] |
|---|---|---|
| PULSE CHARGING | 190 | 0.1 |
| PULSE DISCHARGING | 1.9 | 10 |
| REST | — | 29.9 |
| TOTAL | — | 40 |

FIG. 4

|  | CURRENT AMOUNT [A] | PERIOD OF TIME [sec] |
|---|---|---|
| PULSE CHARGING | 190 | 0.1 |
| PULSE DISCHARGING | 190 | 0.1 |
| REST | — | 39.8 |
| TOTAL | — | 40 |

FIG. 5

|  | FULL CHARGE CAPACITY RETENTION | | | |
|---|---|---|---|---|
|  | FIRST DISCHARGE PATTERN (1ST TIME) | FIRST DISCHARGE PATTERN (2ND TIME) | FIRST DISCHARGE PATTERN (3RD TIME) | SECOND DISCHARGE PATTERN |
| 0th | 100.0 | 100.0 | 100.0 | 100.0 |
| 10000th | 40.4 | 39.6 | 39.1 | 86.1 |
| 15000th |  |  |  | 79.0 |

FIG. 6

DISCHARGE CONTROL DEVICE FOR SECONDARY BATTERY

TECHNICAL FIELD

The present invention relates to a discharge control device for a secondary battery, for controlling discharge from a secondary battery.

BACKGROUND ART

Regarding a secondary battery such as a lithium ion, or the like, various techniques have been proposed (see, e.g., Patent Documents 1 to 4).

Patent document 1 discloses a technique for preventing electrical power in excess of a battery limit from being input to a battery in a hybrid vehicle when slip occurs. Specifically, the disclosed technique concerns drive control of an internal combustion engine, a power conversion drive power transmission means, and a motor, such that upon detection of slip due to an idling driving wheel, drive power is output to a drive shaft to suppress the slip within the range of an input limit of a battery.

Patent Document 2 discloses a technique for carrying out pulse charging/discharging to alternately repeat charging and discharging when at least either one of constant-voltage charging and constant-voltage discharging is carried out while a process for determining a remaining capacity of a battery is carried out in a hybrid vehicle. Further, Patent Document 2 discloses that repairable temporary deterioration of a battery can be repaired by carrying out pulse charging/discharging while constant-voltage charging or constant-voltage discharging is carried out, to thereby promote activation of a battery electrode.

Patent Document 3 discloses a technique for use in manufacturing of a nonaqueous electrolyte secondary battery, for carrying out primary charging by pouring electrolyte after formation of an uncharged secondary battery and thereafter, while maintaining high temperature, for carrying out secondary charging and subsequently discharging to thereby preventing deposition of lithium on an anode surface.

Patent document 4 discloses a technique for measuring a remaining capacity of a lead storage battery in a short time. According to this technique, in order to obtain a voltage corresponding to the depth of discharge, a predetermined amount of power is discharged, followed by a rest period. An open circuit voltage is measured several times immediately after the rest period and after elapse of a predetermined period of time, and an amount of power substantially identical to that which has been discharged is charged, followed by a rest period. An open circuit voltage is then measured several times immediately after the rest period and after elapse of a predetermined period of time.

RELATED ART DOCUMENTS

Patent Document 1: Japanese Patent Laid-open Publication No. 2005-51887
Patent Document 2: Japanese Patent Laid-open Publication No. 2004-236381
Patent Document 3: Japanese Patent Laid-open Publication No. Hei 11-26020
Patent Document 4: Japanese Patent Laid-open Publication No. Hei 4-363679

SUMMARY OF THE INVENTION

Problem to be Solved by the Invention

In a secondary battery, overcharging would deteriorate battery performance. For example, for a lithium ion secondary battery, once the battery is placed in an excessively charged state, lithium metal begins being deposited on the anode surface at a point at which the negative potential becomes equal to the lithium reference potential 0 [V], causing a disadvantage such as drop in a full charge capacity.

Note that one of the causes of excessive charging of a secondary battery is to charge a secondary battery by an excessive pulse (undue pulse). Charging by an excessive pulse may occur in, e.g., a hybrid vehicle, an electric vehicle, and so forth, when grip is restored after a slip occurs. Specifically, in an electric vehicle with a driving wheel being driven by a motor, an excessive current pulse is caused in a motor when grip is restored after the driving wheel slips, as a result of which an excessive current pulse is input to the secondary battery, which leaves the secondary battery in an excessively charged state.

In view of the above, according to the present invention, there is provided a discharge control device for a secondary battery, capable of preventing or reducing deterioration of a secondary battery due to charging by an excessive pulse.

Means for Solving the Problem

A discharge control device for a secondary battery according to the present invention comprises a detection unit for detecting charging of a secondary battery by a pulse at a level equal to or higher than a predetermined level, and a discharge control unit for controlling, upon detection of charging of a secondary battery by the pulse, so as to discharge one or more pulses at a level substantially identical to that of the pulse from the secondary battery.

According to one aspect of the present invention, upon detection of charging of a secondary battery by the pulse, the discharge control unit may control so as to discharge a pulse at a level and duration substantially identical to that of the pulse from the secondary battery.

According to one aspect of the present invention, a motor to be driven by power of the secondary battery may be connected to the secondary battery, and the discharge control unit may apply phase control to the motor to thereby discharge the pulse from the secondary battery to the motor.

According to one aspect of the present invention, the secondary battery may be a lithium ion secondary battery.

Advantage of the Invention

According to the present invention, it is possible to prevent or reduce deterioration of a secondary battery due to charging by an excessive pulse.

BRIEF DESCRIPTION OF DRAWINGS

FIG. 4 is a diagram showing a first charge/discharge pattern;

FIG. 5 is a diagram showing a second charge/discharge pattern;

FIG. 6 is a diagram showing a result of measurement of full charge capacity retention;

BEST MODE FOR CARRYING OUT THE INVENTION

In the following, an embodiment of the present invention will be described referring to the accompanying drawings.

Figure 1:
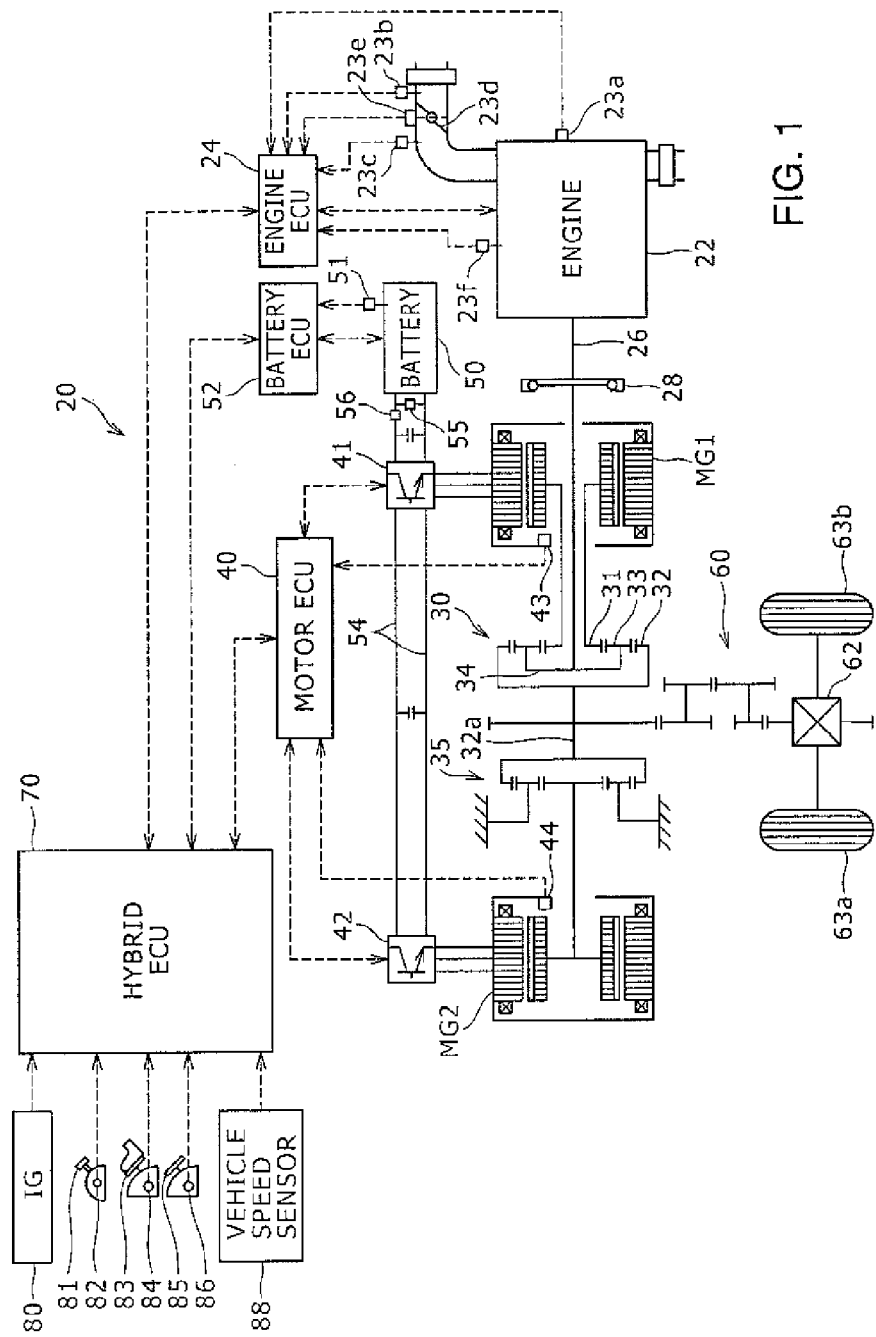
FIG. 1 is a schematic structural diagram showing a structure of a hybrid vehicle including a discharge control device for a secondary battery according to an embodiment.

FIG. 1 is a schematic diagram showing a structure of a hybrid vehicle 20 including a discharge control device for a secondary battery according to this embodiment. As shown, the hybrid vehicle 20 comprises an engine 22, a triaxial power distribution/integration mechanism 30 connected via a damper 28 to a crank shaft 26 as an output shaft of the engine 22, a motor MG1 connected to the power distribution/integration mechanism 30, a deceleration gear 35 mounted on a ring gear shaft 32*a* as a drive shaft connected to the power distribution/integration mechanism 30, a motor MG2 connected to the deceleration gear 35, and a hybrid electronic control unit (hereinafter referred to as a hybrid ECU) 70 for controlling all of these components.

The engine 22 is an internal combustion engine for outputting drive power, using hydrocarbon fuel such as gasoline, light oil, or the like. The engine 22 is subjected to drive control such as fuel injection control, ignition control, air intake control, or the like, by an engine electronic control unit (hereinafter referred to as an engine ECU) 24. Signals from various sensors for determining a state of operation of the engine 22 are input to the engine ECU 24. Specifically, a crank angle θ from a crank position sensor 23*a* mounted on the crank shaft 26, an intake air temperature Ta from an intake air temperature sensor 23*b* mounted on an air intake system, an intake air pressure Va from a negative pressure detection sensor 23*c*, an open degree (throttle open degree) SP of a throttle valve 23*d* from the throttle position sensor 23*e*, a cooling water temperature Tw from a cooling water temperature sensor 23*f* mounted on the cooling system of the engine 22, and so forth, are input to the engine ECU 24. Further, the engine ECU 24, which communicates with the hybrid ECU 70, applies drive control to the engine 22, based on a control signal from the hybrid ECU 70, and outputs data concerning the state of operation of the engine 22 to the hybrid ECU 70 when necessary.

The power distribution/integration mechanism 30 is formed as a planet gear mechanism comprising a sun gear 31 as an outer teeth gear, a ring gear 32 as an internal teeth gear concentric with the sun gear 31, a plurality of pinion gears 33 engaged with the sun gear 31 and the ring gear 32, and a carrier 34 for holding a plurality of pinion gears 33 in a rotatable and revolving manner, and for carrying out a differential function, using the sun gear 31, the ring gear 32, and the carrier 34 as rotating elements. In the power distribution/integration mechanism 30, the crank shaft 26 of the engine 22 is connected to the carrier 34, a motor MG1 is connected to the sun gear 31, and the deceleration gear 35 is connected to the ring gear 32 via the ring gear shaft 32*a*, so that when the motor MG1 operates as a power generator, drive power from the engine 22, input from the carrier 34, is distributed to the sun gear 31 side and the ring gear 32 side according to the gear ratio between the sun gear 31 and the ring gear 32, and when the motor MG1 operates as a motor, drive power from the engine 22, input from the carrier 34, and drive power from the motor MG1, input from the sun gear 31, are integrated before being output to the ring gear 32 side. The drive power output to the ring gear 32 is finally output to the driving wheels 63*a*, 63*b* of a vehicle from the ring gear shaft 32*a* via the gear mechanism 60 and the differential gear 62.

The motors MG1, MG2 are both formed as a known synchronous power generation motor capable of operating as a power generator and also as a motor, and exchange power with the battery 50 via the inverters 41, 42. A power line 54 connecting the inverters 41, 42 and the battery 50 includes a cathode bus and an anode bus commonly used by the inverters 41, 42 so that the power generated by either of the motors MG1, MG2 can be consumed by the other motor. Therefore, the battery 50 is charged/discharged by the power generated by or lacking in either of the motors MG1, MG2. Note that when the power is balanced by the motors MG1, MG2, the battery 50 need not be charged or discharged. The motors MG1, MG2 are both subjected to drive control by a motor electronic control unit (hereinafter referred to as a motor ECU) 40. Signals necessary for carrying out drive control to the motors MG1, MG2, signals from the rotation position detection sensors 43, 44 for detecting the rotation position of, e.g., a rotor of the motors MG1, MG2, a phase current to be applied to the motors MG1, MG2, detected by a current sensor (not shown), and so forth, are input to the motor ECU 40, and the motor ECU 40 outputs a switching control signal to the inverters 41, 42. The motor ECU 40, which communicates with the hybrid ECU 70, controls the inverters 41, 42, based on a control signal from the hybrid ECU 70, and outputs data concerning the state of operation of the motors MG1, MG2 to the hybrid ECU 70 when necessary.

The battery 50 is managed by a battery electronic control unit (hereinafter referred to as a battery ECU) 52. The battery ECU 52 is supplied with signals necessary for managing the battery 50, such as, e.g., a detected voltage value from a voltage sensor 55 for detecting an inter-terminal voltage of the battery 50, provided between terminals of the battery 50, a detected current value from a current sensor 56 for detecting a charge/discharge current of the battery 50, provided on the power line 54 connected to the output terminal of the battery 50, a battery temperature Tb from a temperature sensor 51 for detecting the temperature of the battery 50, and so forth. The battery ECU 52 outputs transmission data concerning a condition of the battery 50 to the hybrid ECU 70 when necessary. The battery ECU 52 has a function for obtaining a remaining capacity (SOC) of the battery 50. Note that the remaining capacity of the battery 50, which may be obtained using any method, may be obtained, e.g., based on an integrated value of a charge/discharge current detected by the current sensor 56.

The hybrid ECU 70 is supplied with an ignition signal from the ignition switch 80, a shift position SP from a shift position sensor 82 for detecting an operation position of the shift lever 81, an accelerator opening degree Acc from an accelerator position sensor 84 for detecting an amount by which the accelerator 83 is pressed down, a brake pedal position BP from a brake pedal position sensor 86 for detecting an amount by which a brake pedal 85 is pressed down, a vehicle speed V from a vehicle speed sensor 88, and so forth. The hybrid ECU 70 is connected for communication with the engine ECU 24, the motor ECU 40, and the battery ECU 52, and exchanges various control signals and data with the engine ECU 24, the motor ECU 40, and the battery ECU 52.

In the hybrid vehicle 20 having the above described structure, a requested torque to be output to the ring gear shaft 32a as a drive shaft is calculated based on the accelerator opening degree Acc and the vehicle speed V, and drive control is applied to the engine 22 and the motors MG1, MG2 such that a requested drive power corresponding to the requested torque is output to the ring gear shaft 32a. Driving control for the engine 22 and the motors MG1, MG2 includes a torque conversion drive mode in which drive control is applied to the engine 22 such that the engine 22 outputs a drive power matching a requested drive power, and drive control is applied to the motors MG1, MG2 such that all of the drive power output from the engine 22 is subjected to torque conversion by the power distribution/integration mechanism 30, the motor MG1, and the motor MG2 before being output to the ring gear shaft 32a, a charge/discharge drive mode in which drive control is applied to the engine 22 such that the engine 22 outputs a drive power matching the sum of a requested drive power and a power necessary to charge/discharge the battery 50 and drive control is applied to the motors MG1, MG2 such that all or a part of the drive power output from the engine 22, following charging/discharging of the battery 50 is subjected to torque conversion by the power distribution/integration mechanism 30 and the motors MG1, MG2 so that the requested drive power is output to the ring gear shaft 32a, and a motor drive mode in which driving control is applied, while keeping the engine 22 in a non-operating state, such that the motor MG2 outputs a drive power matching a requested drive power to the ring gear shaft 32a.

In the above described hybrid vehicle 20, when grip of the driving wheels 63a, 63b is restored after the driving wheels 63a, 63b slip, an excessive current pulse occurs in the motor MG2 and is input to the battery 50. Charging the battery 50 with this excessive current pulse results in excessive charging of the battery 50, as described above, which leads to deposition of lithium metal and deterioration of battery performance.

Note that charging the battery 50 with an excessive current pulse may possibly be caused by a cause such as sudden braking, and so forth, other than slip and grip.

In this embodiment, in order to prevent or reduce deterioration of the battery 50 due to charging with an excessive current pulse, a discharge control device 100 for a secondary battery is provided in the hybrid vehicle 20.

According to one aspect, the discharge control device 100 is realized through cooperation between hardware resources and software, and is, e.g., a computer. Specifically, the function of the discharge control device 100 is realized by causing a CPU (Central Processing Unit) to execute a program recorded in a recording medium and read to the main memory. The above described program can be provided as being recorded in a computer readable recording medium or as a data signal via transmission. Alternatively, the discharge control device 100 may be realized using hardware alone. The discharge control device 100 may be realized using a single physical device or two or more physical devices. For example, the discharge control device 100 is realized using the motor ECU 40, the battery ECU 52, and the hybrid ECU 70.

Figure 2:
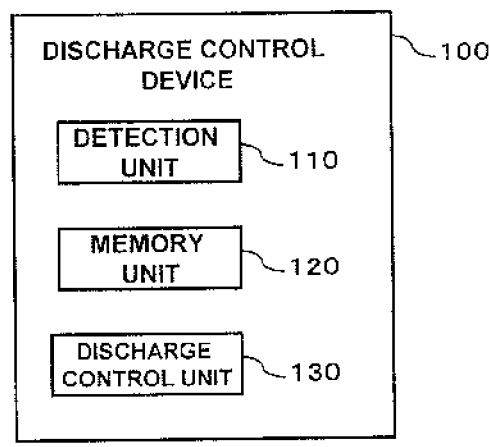
FIG. 2 is a block diagram showing one example of a functional structure of a discharge control device for a secondary battery.

FIG. 2 is a block diagram showing one example of a functional structure of a discharge control device 100 for a secondary battery. In the following, a functional structure of the discharge control device 100 will be described with reference to FIG. 2.

In FIG. 2, the discharge control device 100 comprises a detection unit 110, a memory unit 120, and a discharge control unit 130.

The detection unit 110 detects charging of the battery 50 with a pulse at a level equal to or larger than a predetermined level (hereinafter referred to as "large current pulse charging").

According to one aspect, the detection unit 110 detects presence of charging of the battery 50 with a current pulse equal to or larger than a predetermined current value. For example, the detection unit 110 monitors a detected value of the current sensor 56, and when a current pulse having a peak current value equal to or larger than a predetermined threshold is input to the battery 50, determines presence of large current pulse charging. According to one aspect, the above described predetermined threshold is expressed as a function having as variables the remaining capacity of the battery 50 and the temperature of the battery 50, and the detection unit 110 calculates the above described threshold based on the remaining capacity of the battery 50 and the temperature of the battery 50.

However, the detection unit 110 may detect large current pulse charging using a method other than the above described method. For example, the detection unit 110 may detect presence of large current pulse charging when a pulse having a peak voltage value or a peak power value equal to or larger than a predetermined threshold is input to the battery 50.

The memory unit 120 stores pulse information describing a pulse corresponding to large current pulse charging. For example, when the detection unit 110 detects large current pulse charging, the memory unit 120 stores pulse information describing a pulse corresponding to the large current pulse charging, according to an instruction from the detection unit 110.

The above described pulse information includes, e.g., a peak value and a duration of a pulse. For example, as the waveform of a pulse is substantially triangular, the peak value of the pulse is the height of the pulse, and the duration of the pulse is the length of the base side of the pulse. In one example, the peak value of a pulse is about 80 to 200 [A], and the duration of a pulse is about 100 to 300 [ms]. Note that pulse information may be any information which makes it possible to control the discharge control unit 130 to be described later, being, e.g., chronological data of current values describing a pulse waveform.

Upon detection by the detection unit 110 of charging of the battery 50 with a pulse at a level equal to or higher than a predetermined level, the discharge control unit 130 controls so as to discharge from the battery 50 one or more pulses at a level substantially identical to that of the pulse. That is, upon detection of large current pulse charging by the detection unit 110, the discharge control unit 130 controls so as to discharge from the battery 50 one or more pulses at a level substantially identical to that of a pulse corresponding to the large current pulse charging.

Specifically, the discharge control unit 130 controls so as to discharge the above described pulse, based on the pulse information stored in the memory unit 120.

According to a preferred aspect, the discharge control unit 130 discharges one or more pulses so that the amount of power of the pulse charged becomes substantially equal to the total amount of power of pulses to be discharged, or the integrated current amount of the pulse charged becomes substantially equal to that to be discharged. According to a more preferable aspect, the discharge control unit 130 controls so as to discharge from the battery 50 a pulse at a level or having a duration substantially identical to that of the pulse charged. The discharge control unit 130 may cause discharge from the battery 50 of a pulse having a waveform substantially identical to that of the pulse charged.

Note that, in this specification, "substantially identical" refers to a concept including being identical. According to one aspect, the discharge control unit 130 causes discharge from the battery 50 of a current pulse having a current value and duration identical to that of a current pulse corresponding to large current pulse charging.

According to one aspect, the discharge control unit 130 applies phase control to the motor MG1 or MG2 to thereby discharge the above described pulse from the battery 50 to the motor MG1 or MG2. For example, the discharge control unit 130 carries out switching control relative to the inverter 42 such that a current pulse having a current value and duration substantially identical to that of a current pulse corresponding to large current pulse charging is discharged from the battery 50 to the motor MG2, and that the motor MG2 outputs a target torque of the motor MG2, which is determined based on an accelerator opening degree or the like. That is, the discharge control unit 130 displaces the phase of a phase current of the motor MG2 to thereby discharge a pulse from the battery 50 to the motor MG2 without affecting the torque required when a vehicle runs.

Figure 3:
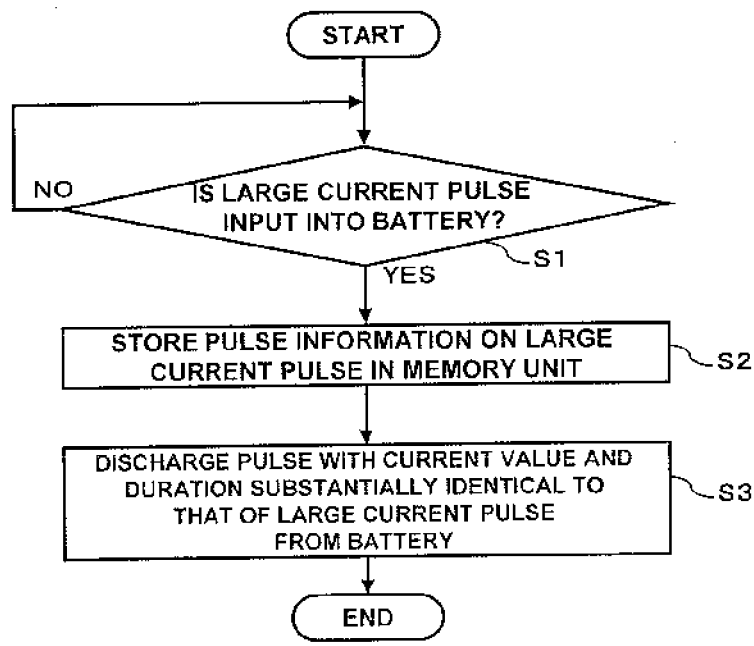
FIG. 3 is a flowchart of an example of a procedure of an operation of a discharge control device for a secondary battery.

FIG. 3 is a flowchart of one example of an operational procedure of the discharge control device 100 for a secondary battery. In the following, an operation of the discharge control device 100 will be described while referring to FIG. 3.

The discharge control device 100 determines, based on an output of the current sensor 56, whether or not a current pulse having a peak current value equal to or larger than a predetermined threshold (hereinafter referred to as "large current pulse") has been input to the battery 50 (S1). Note that the discharge control device 100 calculates in advance and then stores the above described threshold, based on the remaining capacity of the battery 50 and the temperature of the battery 50. The above described threshold is calculated at a discretional time and updated.

The discharge control device 100 repeats the determination process at S1 until it is determined that a large current pulse is input to the battery 50.

With determination at S1 to the effect that a large current pulse has been input to the battery 50, the discharge control device 100 stores the peak current value and duration of the large current pulse as pulse information on the large current pulse in the memory unit 120 (S2).

Thereafter, the discharge control device 100 applies phase control to the motor MG2, based on the pulse information stored in the memory unit 120, to thereby discharge a pulse having a current value and duration substantially identical to that of the large current pulse from the battery 50 to the motor MG2 (S3). Note that a pulse to be discharged is a triangular pulse having a height identical to the peak current value of the pulse stored in the memory unit 120 and a length of the base of a triangle identical to the duration of the pulse stored in the memory unit 120.

According to the above described embodiment, the following effects can be obtained.

(1) Upon detection of charging of a secondary battery by a pulse at a level equal to or higher than a predetermined level, the discharge control device for a secondary battery according to this embodiment controls so as to discharge one or more pulses, at a level substantially identical to that of the pulse, from the secondary battery. With the above, it is possible to prevent or reduce deterioration of a secondary battery due to charging with an excessive pulse.

For example, in the case of the above described secondary battery being a lithium ion secondary battery, it is possible, through the above described control, to modify or suppress deposition of lithium metal to thereby prevent or reduce deterioration of battery performance such as drop in a full charge capacity.

(2) According to one aspect, a motor is connected to a secondary battery and driven by the power of the secondary battery, and the discharge control device applies phase control to the motor to thereby discharge the above described pulse from the secondary battery to the motor. According to this aspect, it is possible to discharge a pulse, using a simple structure.

Note that the present invention is not limited to the above described embodiment, but can be modified in various manners within a range not departing from the gist of the present invention.

For example, although a structure in which a pulse is discharged from a secondary battery to a motor through phase control applied to a motor is described as an example in the above described embodiment, a pulse may be discharged using a method other than the above. For example, discharge resistance may be connected to a secondary battery to cause the discharge resistance to discharge a pulse.

Also, although a case in which the present invention is applied to a hybrid vehicle is described as an example in the above described embodiment, the present invention can be applied to an electric vehicle other than a hybrid vehicle. Further, the present invention can be applied not only to an electric vehicle but also widely to a system in which an electric circuit is connected to a secondary battery.

EXAMPLES

In the following, a result of measurement of full charge capacity retention is shown. Note that a lithium ion secondary battery is used in this example.

Figure 7:
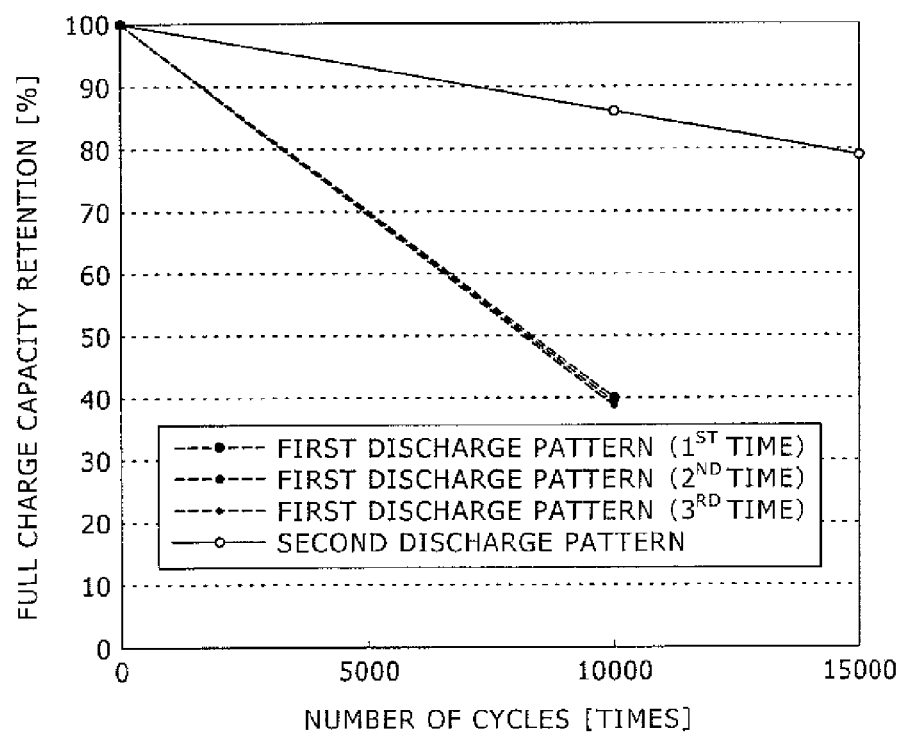
FIG. 7 is a graph showing a result of measurement of full charge capacity retention.

FIG. 4 is a diagram showing a first charge/discharge pattern. FIG. 5 is a diagram showing a second charge/discharge pattern. FIG. 6 is a diagram showing a result of measurement of full charge capacity retention. FIG. 7 is a graph showing a result of measurement of full charge capacity retention.

The first charge/discharge pattern is a pattern in which pulse charging, pulse discharging, and rest are sequentially carried out. Note that a pulse related to pulse charging is a triangular pulse having a peak current amount of 190 [A] and a duration of 0.1 [sec]. A pulse related to pulse discharging is a triangular pulse having a peak current amount being 1.9 [A] and duration being 10 [sec]. A rest period lasts for 29.9 [sec]. The total period of time of the first charge/discharge pattern is 40 [sec].

A second charge/discharge pattern is a pattern in which pulse charging, pulse discharging, and rest are sequentially carried out. Note that a pulse related to pulse charging is a triangular pulse having a peak current amount of 190 [A] and a duration of 0.1 [sec]. A pulse related to pulse discharging is a triangular pulse having a peak current amount of 190 [A] and duration of 0.1 [sec]. A rest period lasts for 39.8 [sec]. The total period of time of the second charge/discharge pattern is 40 [sec].

As to a lithium ion secondary battery, an experiment is carried out three times, in each of which the first charge/discharge pattern is repeated 10,000 times and full charge capacity retention is measured upon completion of the 10,000$^{th}$ pattern. The experiment proves, as shown in FIGS. 6 and 7, that the full charge capacity retention is 40.4%, 39.6%, 39.1%.

As to a lithium ion secondary battery having the same specification as that of the above described lithium ion secondary battery, an experiment is carried out once in which the second charge/discharge pattern is repeated 15,000 times and full charge capacity retention is measured upon completion of the $10,000^{th}$ pattern and the $15,000^{th}$ pattern. The experiment proves, as shown in FIGS. 6 and 7, that the full charge capacity retention is 86.1% upon completion of the $10,000^{th}$ pattern and 79.0% upon completion of the $15,000^{th}$ pattern.

It is known from the above described measurement result that discharging using a pulse identical to that which is used in charging results in a smaller drop in a full charge capacity than discharging using a pulse smaller but longer than that which is used in charging.

Figure 8:
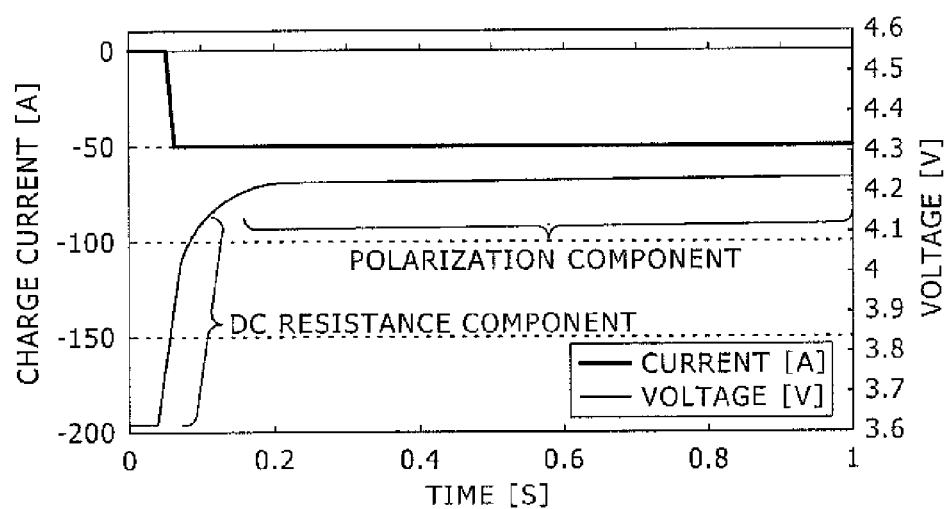
FIG. 8 is a diagram showing a part of a voltage waveform with a pulse current applied to a lithium ion secondary battery.

FIG. 8 is a diagram showing a part of a voltage waveform appearing when a pulse current is applied to a lithium ion secondary battery.

As shown in FIG. 8, while a voltage when charging with a large current for a shorter period is mostly composed of DC resistance components, it is not possible to obtain a voltage identical to that in charging, even when an integrated current amount identical to that in charging is ensured by continuing discharging of a smaller current for a longer period of time and polarization components are gained by continuing the discharging for a whatever longer period of time, as a DC resistance component is small in a low current. Therefore, it is not possible to suppress deposition of lithium metal when discharging using a smaller but longer pulse than that which is used in charging, and thus it is expected that full charge capacity would drop.

Meanwhile, as a voltage substantially identical to that in charging can be realized in discharging using a pulse identical to that which is used in charging, deposition of lithium metal can be suppressed. Thus, it is expected that drop of full charge capacity can be suppressed. Further, when discharging is carried out a few times in a divided manner, using a peak current identical to that which is used in charging, such that an identical integrated current amount is ensured between charging and discharging, a voltage substantially identical to that in charging can be realized. Therefore, it is possible to suppress deposition of lithium metal, and thus it is expected that drop of full charge capacity can be suppressed.

[Description Of Reference Numerals]

20 hybrid vehicle, 22 engine, 23a crank position sensor, 23b intake air temperature sensor, 23c negative pressure detection sensor, 23d throttle valve, 23e throttle position sensor, 23f cooling water temperature sensor, 24 engine electronic control unit (engine ECU), 26 crank shaft, 28 damper, 30 power distribution/integration mechanism, 31 sun gear, 32 ring gear, 32a ring gear shaft, 33 pinion gear, 34 carrier, 35 deceleration gear, 40 motor electronic control unit (motor ECU), 41, 42 inverter, 43, 44 rotation position detection sensor, 50 battery, temperature sensor, 52 battery electronic control unit (battery ECU), 54 power line, 55 voltage sensor, 56 current sensor, 60 gear mechanism, 62 differential gear, 63a, 63b driving wheel, 70 hybrid electronic control unit (hybrid ECU), 80 ignition switch, 81 shift lever, 82 shift position sensor, 83 accelerator, 84 accelerator position sensor, 85 brake pedal, 86 brake pedal position sensor, 88 vehicle speed sensor, MG1, MG2 motor, 100 discharge control device, 110 detection unit, 120 memory unit, 130 discharge control unit.

What is claimed is:

1. A discharge control device for a lithium ion secondary battery, the discharge control device comprising:
a calculator that calculates an overcharging level based on a temperature and a remaining capacity of the secondary battery, the overcharging level is specified as a level causing degradation of the secondary battery due to a deposition of lithium metal;
a detector that detects whether a level of a pulse for charging the secondary battery is equal to or higher than the overcharging level calculated by the calculator; and
a controller that controls a discharge of one or more pulses from the secondary battery, if the detector detects that the level of the pulse for charging the secondary battery is equal to or higher than the overcharging level, the one or more pulses discharged from the secondary battery have a level substantially identical to that of the pulse for charging the secondary battery.

2. The discharge control device for a secondary battery according to claim 1, wherein, upon detection of charging of the secondary battery with the pulse, the controller controls a discharge of a pulse of the one or more pulses to have a level and duration substantially identical to that of the pulse for charging the secondary battery.

3. The discharge control device for a secondary battery according to claim 1, wherein
the secondary battery is connected to a motor to be driven by power of the secondary battery, and
the controller applies phase control to the motor to thereby discharge the pulse from the secondary battery to the motor.

4. The discharge control device for a secondary battery according to claim 1, wherein, upon detection of charging of the secondary battery with the pulse, the controller controls a discharge of a pulse of the one or more pulses to have a level that is substantially identical to that of the pulse for charging the secondary battery.

5. The discharge control device for a secondary battery according to claim 4, wherein the discharged pulse has a pulse height that is substantially identical to that of the pulse for charging the secondary battery.

6. The discharge control device for a secondary battery according to claim 4, wherein the discharged pulse has peak current value that is substantially identical to that of the pulse for charging the secondary battery.

* * * * *